(12) United States Patent
Dave et al.

(10) Patent No.: US 8,966,347 B2
(45) Date of Patent: Feb. 24, 2015

(54) FORWARD ERROR CORRECTION WITH PARALLEL ERROR DETECTION FOR FLASH MEMORIES

(71) Applicant: Viasat, Inc., Carlsbad, CA (US)

(72) Inventors: Sameep Dave, Stow, OH (US); Russell Fuerst, Mentor, OH (US); Mark Kohoot, Cleveland Heights, OH (US); Jim Keszenheimer, Chagrin Falls, OH (US); William H Thesling, Hudson, OH (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 14/086,807

(22) Filed: Nov. 21, 2013

(65) Prior Publication Data
US 2014/0157089 A1     Jun. 5, 2014

Related U.S. Application Data

(63) Continuation of application No. 12/858,510, filed on Aug. 18, 2010, now Pat. No. 8,615,700.

(60) Provisional application No. 61/234,911, filed on Aug. 18, 2009.

(51) Int. Cl.
*G06F 11/00* (2006.01)
*G06F 11/10* (2006.01)

(52) U.S. Cl.
CPC .................. *G06F 11/1068* (2013.01)
USPC ...................................................... 714/774

(58) Field of Classification Search
CPC ... G06F 11/1068; G06F 11/263; G06F 11/30; G06F 11/0727; G06F 11/0781; G06F 11/10; G06F 11/1048
USPC ........................................ 714/758, 773, 774
See application file for complete search history.

(56) References Cited

U.S. PATENT DOCUMENTS 5,699,365 A  * 12/1997  Klayman et al. .............. 714/708
6,684,353 B1    1/2004  Parker et al.
(Continued)

FOREIGN PATENT DOCUMENTS

| EP | 1 612 950 A1 | 1/2006 |
| EP | 2 299 362 A2 | 3/2011 |
| WO | WO-2006/013529 A1 | 2/2006 |

OTHER PUBLICATIONS

European Search Report and Search Opinion mailed in European Patent Application No. 10173328.5 on Apr. 5, 2011, 7 pgs.

(Continued)

*Primary Examiner* — Bryce Bonzo
*Assistant Examiner* — Elmira Mehrmanesh

(57) ABSTRACT

Methods, systems, and devices are described for forward error correction for flash memory. Encoded data from flash memory may be used to generate a number of data streams. At each of a number of error detection sub-modules operating in parallel, a different one of the data streams is processed. Each error detection sub-module may detect whether a portion of the respective received stream contains an error, and forward the portion to an error correction module. The error correction module, physically separate from the error detection sub-modules, may correct the forwarded portions of the respective received streams containing an error. The age and error rate associated with the flash memory may be monitored, and a coding rate or other aspects may be dynamically adapted to account for these factors.

24 Claims, 7 Drawing Sheets

(56) References Cited

U.S. PATENT DOCUMENTS

| | | | |
|---|---|---|---|
| 6,751,766 | B2 | 6/2004 | Guterman et al. |
| 7,155,063 | B2 | 12/2006 | Chiba |
| 7,203,874 | B2 | 4/2007 | Roohparvar |
| 7,231,585 | B2 | 6/2007 | Vainsencher et al. |
| 7,257,764 | B2 | 8/2007 | Suzuki et al. |
| 7,296,213 | B2 | 11/2007 | Vainsencher et al. |
| 7,304,893 | B1 | 12/2007 | Hemink et al. |
| 7,305,596 | B2 | 12/2007 | Noda et al. |
| 7,333,364 | B2 | 2/2008 | Yu et al. |
| 7,356,755 | B2 | 4/2008 | Fackenthal |
| 7,360,136 | B2 | 4/2008 | Guterman et al. |
| 7,394,689 | B2 | 7/2008 | Ryu |
| 7,941,731 | B2 | 5/2011 | Okazaki et al. |
| 8,103,942 | B2 | 1/2012 | Kuroishi et al. |
| 8,296,620 | B2 * | 10/2012 | Chen et al. ............... 714/758 |
| 8,615,700 | B2 | 12/2013 | Dave et al. |
| 8,627,169 | B2 * | 1/2014 | Shrader ............... 714/758 |
| 2003/0037299 | A1* | 2/2003 | Smith ............... 714/763 |
| 2003/0041299 | A1* | 2/2003 | Kanazawa et al. ........... 714/766 |
| 2004/0083334 | A1* | 4/2004 | Chang et al. ............... 711/103 |
| 2004/0153940 | A1* | 8/2004 | Yu et al. ............... 714/746 |
| 2004/0243906 | A1* | 12/2004 | Huang ............... 714/758 |
| 2005/0138521 | A1* | 6/2005 | Suzuki et al. ............... 714/755 |
| 2005/0172179 | A1* | 8/2005 | Brandenberger et al. ..... 714/718 |
| 2006/0059406 | A1* | 3/2006 | Micheloni et al. ............ 714/763 |
| 2006/0245417 | A1* | 11/2006 | Conner et al. ............... 370/352 |
| 2007/0171730 | A1* | 7/2007 | Ramamoorthy et al. 365/185.33 |
| 2007/0204206 | A1* | 8/2007 | Lee et al. ............... 714/784 |
| 2007/0208905 | A1* | 9/2007 | Litsyn et al. ............... 711/103 |
| 2007/0223277 | A1* | 9/2007 | Tanaka et al. ............ 365/185.09 |
| 2007/0266295 | A1* | 11/2007 | Conley ............... 714/763 |
| 2007/0266296 | A1* | 11/2007 | Conley ............... 714/763 |
| 2007/0271494 | A1* | 11/2007 | Gorobets ............... 714/763 |
| 2007/0283428 | A1* | 12/2007 | Ma et al. ............... 726/9 |
| 2008/0052564 | A1* | 2/2008 | Yim et al. ............... 714/699 |
| 2008/0072120 | A1* | 3/2008 | Radke ............... 714/768 |
| 2008/0109703 | A1* | 5/2008 | Brandman ............... 714/763 |
| 2008/0130341 | A1* | 6/2008 | Shalvi et al. ............... 365/45 |
| 2008/0148132 | A1* | 6/2008 | Mavila ............... 714/779 |
| 2008/0163028 | A1* | 7/2008 | Mokhlesi ............... 714/763 |
| 2008/0168320 | A1* | 7/2008 | Cassuto et al. ............... 714/746 |
| 2008/0184094 | A1* | 7/2008 | Murray et al. ............... 714/763 |
| 2008/0212371 | A1* | 9/2008 | Roohparvar ............ 365/185.09 |
| 2008/0244362 | A1* | 10/2008 | Liu et al. ............... 714/758 |
| 2008/0244370 | A1* | 10/2008 | Lam ............... 714/803 |
| 2008/0270680 | A1* | 10/2008 | Chang ............... 711/103 |
| 2008/0276150 | A1* | 11/2008 | Kong et al. ............... 714/755 |
| 2008/0282128 | A1* | 11/2008 | Lee et al. ............... 714/755 |
| 2008/0301526 | A1* | 12/2008 | Kohler et al. ............... 714/764 |
| 2008/0313493 | A1* | 12/2008 | Roohparvar et al. ............. 714/6 |
| 2009/0013234 | A1* | 1/2009 | Radke ............... 714/752 |
| 2009/0249151 | A1* | 10/2009 | Zhou et al. ............... 714/748 |

OTHER PUBLICATIONS

Chen et al., "Error Correction for Multi-Level NAND Flash Memory Using Reed-Solomon Codes", IEEE, 2008, pp. 94-99.

Micron Technology, Inc., "Design and Use Considerations for NAND Flash Memory", TN-29-17, Technical Note, Aug. 2006, 8 pgs.

Micron Technology, Inc., "Micron® ECC Module for NAND Flash via Xilinx® Spartan™-3 FPGA", TN-29-05, Technical Note, May 2007, 21 pgs.

Micron Technology, Inc., "Hamming Codes for NAND Flash Memory Devices", TN-29-08, Technical Note, May 2007, 7 pgs.

Micron Technology, Inc., "NAND Flash Performance Improvement Using Internal Data Move", TN-29-15, Technical Note, Jun. 2007, 7 pgs.

Micron Technology, Inc., "Using Copyback Operations to Maintain Data Integrity in NAND Flash Devices", TN-29-41, Technical Note, Oct. 2008, 4 pgs.

Micron Technology, Inc., "Wear-Leveling Techniques in NAND Flash Devices", TN-29-42, Technical Note, Oct. 2008, 8 pgs.

Numonyx, "Error Correction Code in Single Level Cell NAND Flash Memories", AN1823, Application Note, May 2008, 19 pgs.

STMicroelectronics, "Error Correction Code in NAND Flash Memories", AN1823, Application Note, May 2004, 14 pgs.

Sun et al., "Multilevel Flash Memory On-Chip Error Correction Based on Trellis Coded Modulation", IEEE, 2006, pp. 1443-1446.

* cited by examiner

FORWARD ERROR CORRECTION WITH PARALLEL ERROR DETECTION FOR FLASH MEMORIES

CROSS-REFERENCES TO RELATED APPLICATIONS

This application is a continuation of U.S. patent application Ser. No. 12/858,510, filed on Aug. 18, 2010, titled "FORWARD ERROR CORRECTION WITH PARALLEL ERROR DETECTION FOR FLASH MEMORIES", which claims priority to U.S. Provisional Patent Application No. 61/234,911, filed Aug. 18, 2009, entitled "FORWARD ERROR CORRECTION FOR FLASH MEMORIES", both of which are hereby expressly incorporated by reference, as if set forth in full in this document, for all purposes.

BACKGROUND

The present invention relates to forward error correction (FEC) in general and, in particular, to FEC for flash memory. The advancements of flash memory technology in recent years has dramatically increased storage capacity and decreased the cost of non-volatile semiconductor memory. This has made Solid State Drives (SSDs) (typically a flash memory-based non-volatile memory system) an emerging substitute for magnetic Hard Disk Drive (HDD).

The use of FEC to enhance the reliability and longevity of flash memory is one of the challenges for making SSDs perform on par with HDDs.

SUMMARY

Methods, systems, and devices are described for forward error correction for flash memory. Encoded data from flash memory may be retrieved to generate a number of data streams (which may, but need not be, partially decoded). At each of a number of error detection sub-modules, a different one of the data streams is processed. Each error detection sub-module may detect whether a portion of the respective received stream contains an error, and forward the portion of the respective stream containing an error to an error correction module. An error correction module may correct the forwarded portions of the respective streams.

The age and error rate associated with the flash memory may be monitored, and a coding rate may be dynamically adapted to account for these factors. The error rate may be monitored on a per-sector basis and, therefore, the coding rate may be adapted on a per-sector (or per-set of sectors) basis. As the error rate increases in certain sets of sectors, additional error-correction sub-modules assigned to those sectors may be powered-up to handle the increased error rate. In one example, there are fewer error correction sub-modules than error detection sub-modules; each error correction sub-module may be time-shared by a number of error detection sub-modules. Also, it is worth noting that the associations between flash memory sectors, error detection sub-modules, and error correction sub-modules may be changed dynamically in response to age and error rates, as well.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
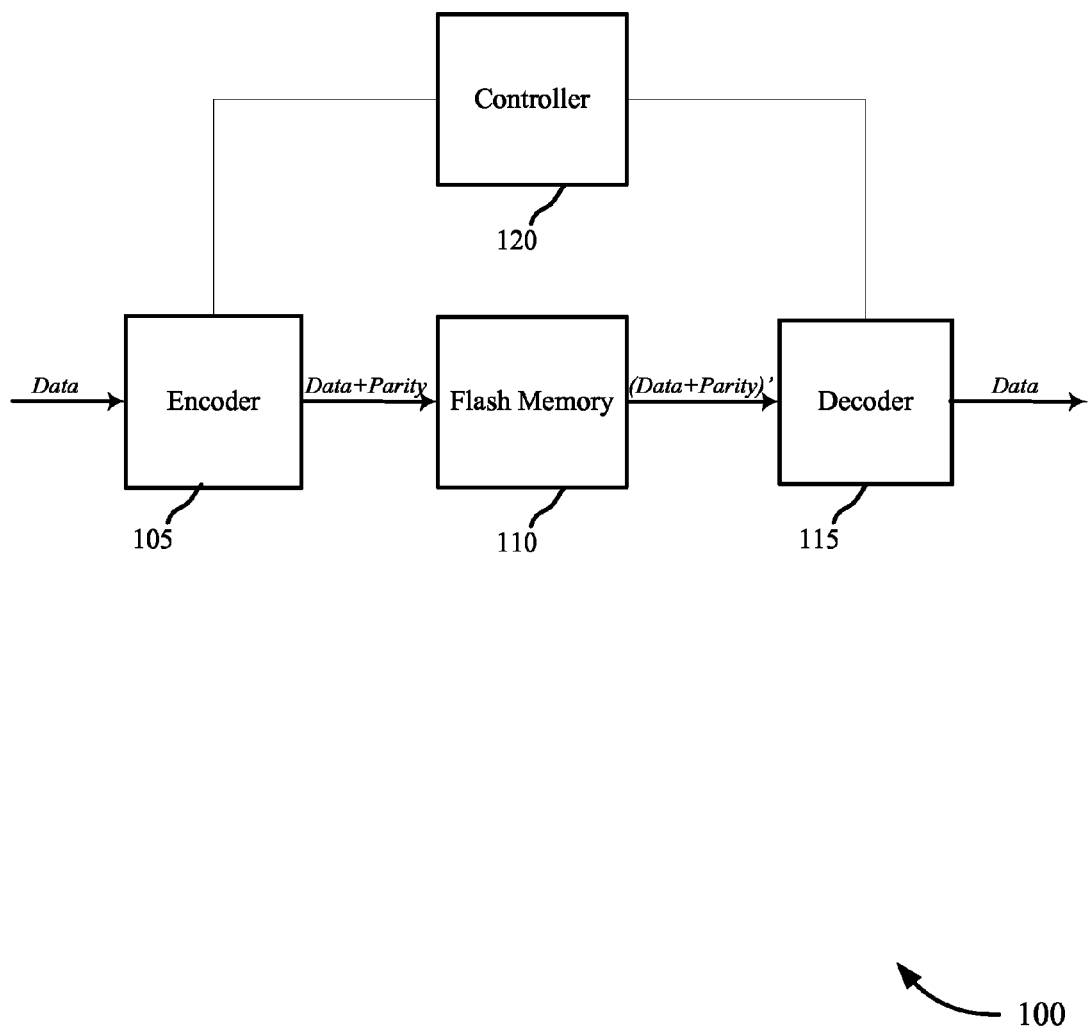
FIG. 1 is a block diagram of a flash memory decoder system according to various embodiments of the invention.

Methods, systems, and devices are described for forward error correction for flash memory. Encoded data from flash memory may be processed to generate a number of data streams. At each of a number of error detection sub-modules operating in parallel, a different one of the data streams is processed. Each error detection sub-module may detect whether a portion of the respective received stream contains an error, and forward the portion to an error correction module. An error correction module, physically separate from the error detection sub-modules, may correct the forwarded portions. The age and error rate associated with the flash memory may be monitored, and a coding rate or other aspects may be dynamically adapted to account for these factors.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Although much of the following discussion relates specifically to flash memory, aspects of the inventions are applicable to other forms of solid state memory. Generally, there are two predominant types of flash memory architectures: NOR and NAND. For the purposes of this disclosure, much discussion is directed to NAND-type flash, while again noting that principles set forth herein have wider applicability.

There are two primary NAND flash technologies. The earlier versions of NAND flash were Single-Level Cell (SLC). With SLC Flash, there is only one programmed state in addition to the erased state. The total of two states allows a single data bit to be stored in the memory cell. The desire for higher density led to the more advanced Multiple-Level Cell (MLC). With MLC flash, there are multiple programmed states in addition to the erased state which allows multiple bits to be stored per memory cell.

Because of this increase in density and the related issues in manufacturing, one of the challenges for flash memory is to maintain high reliability and longevity. The deterioration of the oxide over time, and the disruptions from neighboring memory pages, can lead to data retention and corruption issues translating into bit errors. While the chances of any given data bit being corrupted is quite small, the vast number of data bits in a storage system makes the likelihood of data corruption a very real possibility. FEC may be one of the tools used to address these bit errors to improve the reliability and lifespan of flash memory.

Systems, devices, methods, and software are described for FEC for flash memory. Turning first to FIG. 1, a flash memory system 100 is illustrated. The system includes an encoder 105, flash memory 110, a decoder 115, and a controller 120. This flash memory system 100 may be a stand-alone device, or may be integrated (in whole or in part) with a computer, server, phone or mobile device, tablet, television, or any other computing device.

Each of these system 100 components may be in communication with each other. The encoder 105, decoder 115, and controller 120 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The encoder 105 may receive data to be stored, and encode the data (e.g., adding parity information) for storage in the flash memory 110 as encoded data. The decoder 115 may include a number of sub-components (not shown). An embodiment of the decoder 115 includes an error correction module in communication with and physically separate from an error detection module. The decoder 115 may process the encoded data to generate a number of data streams (which may, but need not be, decoded in whole or in part). The decoder 115 may process each stream at a different error detection sub-module operating in parallel in the decoder 115. Each error detection sub-module may detect whether a portion of the respective received stream contains an error, and then forward the portion of the respective received stream containing an error to the error correction module. The error correction module may correct the forwarded portions of the respective received streams containing an error.

There are a number of different FEC schemes and codes that may be used in the flash memory system 100 introduced above. The system 100 functionality may be also be leveraged in a number of ways. For example, the error detection module may detect and flag bit errors, and this may allow sectors of memory with errors exceeding a threshold amount to be avoided by replacing such sectors with other sectors from a pool of available substitutes. The encoder 105 may, also or alternatively, change the code rate for the error-laden sections. As flash become more dense, the inherent bit error probability becomes higher.

Some simple FEC coding may be used to clean up these errors. The Hamming Code, with correction capacity of 1 bit and detection capability of 2, may be used with flash memory 110. With the desire for improving the performance, as well as the increased probability of inherent bit errors because of the denser memories, Bose Chaudhuri Hocqunghem (BCH) codes may be used, including the binary BCH and non-binary BCH (Reed Solomon (RS)) codes. These codes offer a higher correction capacity in comparison to the Hamming Code.

BCH encoding/decoding architectures may be the foundation of error correction in flash memory. However, there are more advanced coding options that may in some instances provide better performance than BCH codes. These codes may be used in flash memory 110, particularly for higher density flash and in applications where performance demands increase. Convolutional Turbo Codes (CTCs), Turbo Product Codes (TPCs), and low density parity check codes (LDPCs) are examples of the coding schemes that may be used. These state-of-the-art codes perform very close to the theoretical limits (Shannon Limits) of error correction, providing very high coding gain and improvement in Bit Error Rate (BER) performance for a given amount of redundancy.

Flash memory does have an inherent probability of error. Depending on the flash technology, this error rate may typically be somewhere between 1 e-5 and 1 e-8. To be able to match an HDD read/write bit error rate of 1 e-15, a FEC scheme may be used. The measure of how good a job a code can perform in increasing the reliability depends upon its correction capacity. If the probability of bit error for flash memory 110 is p and the correction capacity of the code is t bits over a codeword length of n bits, the probability of making an error may be expressed as:

$$p_{decoded} = \sum_{i=t+1}^{n} p^i * (1-p)^{n-i} \quad (1)$$

From equation (1), for a given p the higher the correction capacity of the code, the smaller the probability of error after the decoding will be. The correction capacity can be expressed as the number of bits a code can correct over a codeword length, or an input BER, or probability of error that it can take down to a certain target decoded BER. The advanced codes may correct more errors over a certain length, or take a higher input BER to create the same decoded BER.

There is incentive to use advanced codes for flash memory 110 even with not so dense memories. If the inherent error performance of flash memory 110 stayed at a certain low level, there would probably be decreased need for advanced codes. But, in practice, flash memory 110 performance tends to degrade over time. This means that even with an advanced code to help improve the reliability of a flash memory 110, over time the flash memory 110 may become lossy and, once the error rate is high enough, it may be beyond repair by the code being used.

In one example, the rate of errors or age of the flash memory 110 may be monitored, and the coding rate for data to be stored on the flash memory 110 may be modified in response thereto. Thus, a more robust coding rate may be used as the decoded error rate increases. The error monitoring may take place on a per-sector basis, and the code rate modification may similarly take place on a per-sector basis. In another example, the rate of errors or age of the flash memory 110 may be monitored, and error correction sub-modules may be powered-up in response thereto. Power savings may be achieved by keeping certain error correction sub-modules in an inactive mode until the flash memory reaches a certain age.

As noted, the flash memory 110 may be partitioned into a pool of small fixed-size sectors, and FEC may be applied on a sector-by-sector basis. The flash memory 110 size may be defined by the number of sectors that it contains. As there is a chance of sectors going bad over time, there may be a reserve/spare sector pool that allows the controller to replace the bad sectors by the spares as needed to extend the life of the flash. The error detection sub-module and error correction sub-modules may be dynamically assigned to various sectors, and the number powered-on may be increased or decreased.

A wear leveling technique may be used bb to make sure that various areas/sectors of the Flash "age" at a similar rate. Instead of the same sector being used over and over again, the read/writes are spread over much or the entire flash. And this translates into the probability of any sector being good ($p_{good}$) may be substantially the same for the various sectors in flash memory 110. If the size of the flash is N sectors and there are $\Delta$ spare sectors, the probability that the flash is still usable after time t is:

$$p_{usable} = \sum_{i=N}^{N+\Delta} (c_i^{N+\Delta} * (p_{good})^i * (1-p_{good})^{N+\Delta-i}) \tag{2}$$

$p_{good}$ may be a function of use time for the flash memory 110 sector. This is a component that is dependent upon the correction capacity of the code used. Thus, even with the spare sectors and the wear-leveling technique, the codes may play a key role in the flash being usable after a certain use time.

One of the concerns regarding advanced codes is how they fit into the sector sizes and overhead requirements of some flash memory architectures. TPC and LDPC codes offer an excellent degree of freedom in selecting the various code parameters like information block size, coded block size, and correction capacity, and would allow customization to suit any number of flash configurations.

Figure 2:
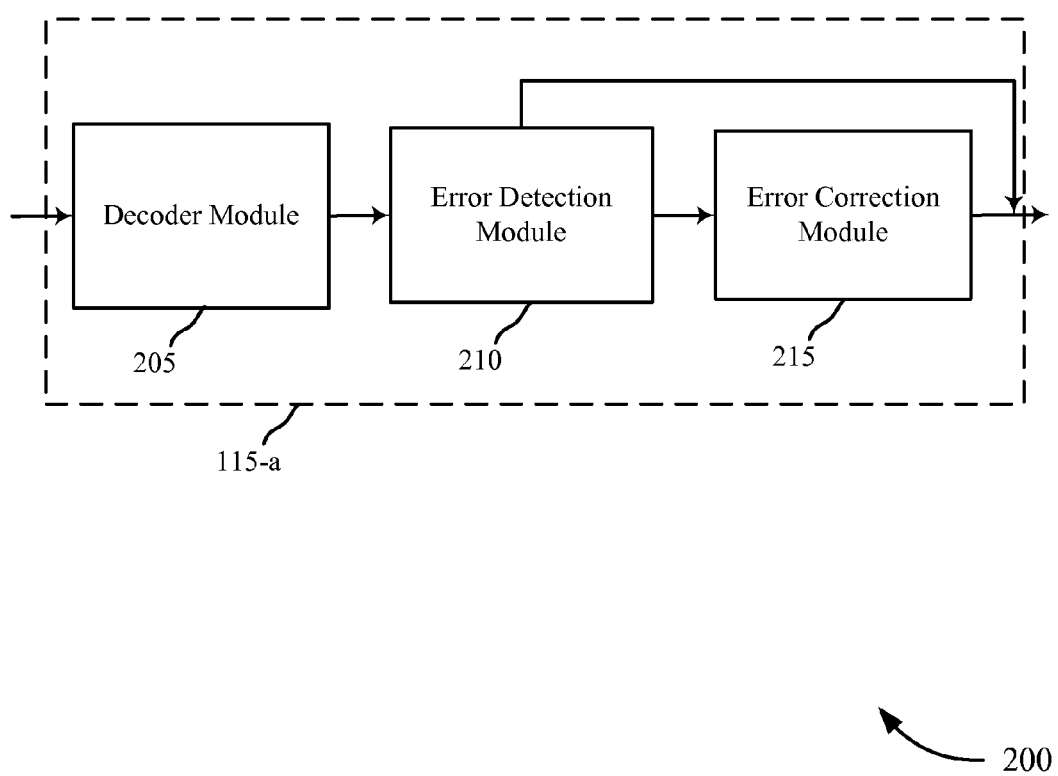
FIG. 2 is a block diagram of a flash memory decoder according to various embodiments of the invention.

FIG. 2 is a block diagram 200 of a flash memory decoder 115-a according to various embodiments of the invention. The flash memory decoder 115-a may, for example, be the decoder 115 of FIG. 1, although flash memory decoder 115-a may be implemented in a number of other systems and devices, as well. The flash memory decoder 115-a includes a decoder module 205, an error detection module 210, and an error correction module 215, and each of may be in communication with each other. In one example, the error detection module 210 includes a number of sub-modules configured to detect errors on decoded streams of data. The error correction module 215 may be physically separate from each error detection sub-module, and may also include a number of sub-modules (each of which may be time-shared by a number of error detection sub-modules).

These components and sub-modules therein may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The decoder module 205 may receive encoded data from flash memory, and process the received encoded data to generate a number of data streams. In one embodiment, the decoder module processor may buffer, de-interleave, or perform certain aspects of the decoding process, an thereby generate decoded (or partially decoded) data streams. As noted, the error detection module 210 may include a number of error detection sub-modules operating in parallel. Each (or a subset) of the error detection sub-modules may receive a different one of the data streams, and evaluate the respective stream to determine whether a portion of the stream contains an error. Each error detection sub-module may forward the portion of the respective received stream containing an error to the error correction module 215 (bypassing the error correction module 215 with the error-free portions). The error correction module 215 corrects the received portions of the respective received streams containing an error. As noted above, the error correction module 215 may include a number of sub-modules (each of which may be time-shared by a number of error detection sub-modules).

Figure 3:
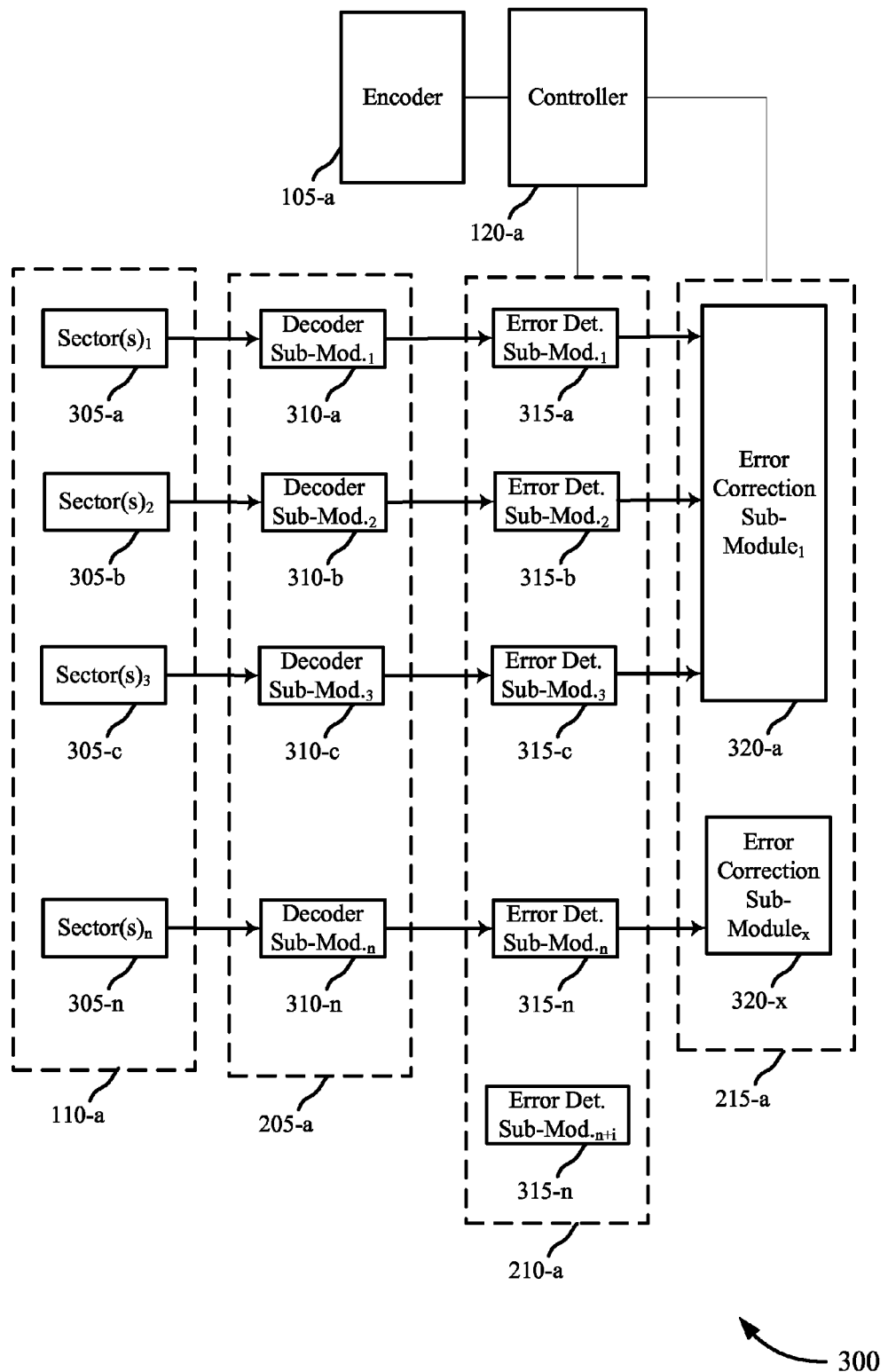
FIG. 3 is a block diagram of a flash memory decoder system illustrating error detection and correction sub-modules according to various embodiments of the invention.

FIG. 3 is a block diagram illustrating an example of an architecture for a flash memory decoder system 300 more particularly illustrating error detection and correction sub-modules. The flash memory decoder system 300 may, for example, be the system 100 of FIG. 1. The flash memory decoder system 300 includes flash memory 110-a, a decoder module 205-a, an error detection module 210-a, an error correction module 215-a, a controller 120-a, and an encoder 105-a. Each of these components may be in communication with each other.

The flash memory 110-a includes a number of different sets of one or more active sectors 305. The decoder module 205-a includes a number of decoder sub-modules 310, and each decoder sub-module 310 may be associated with a different set of sectors 305. The error detection module 210-a includes a number of error detection sub-modules 315, and each decoder sub-module 310 may be associated with a different set of sectors 305. Thus, encoded data may be read from a set of one or more of sectors 305 (e.g., sector(s) 305-a) by a decoder sub-module 310 (e.g., decoder sub-module 310-a), and processed (e.g., buffered, de-interleaved, decoded to some extent, etc.) to generate a data stream. The data stream may be forwarded to an error detection sub-module 315 (error detection sub-module 315-a). Thus, encoded data from a set of one or more of sectors 305-a may be sent to an error detection sub-module 315-a. Different sets of sectors 305 may each send their respective data via different decoder sub-modules 310, as illustrated. In one embodiment, each error detection sub-module 315 is distinct from each other. In other embodiments, the decoder sub-module 310 and error detection sub-module 315 may be integrated to varying degrees.

Each error detection sub-module 315 may evaluate the respective stream to determine whether a portion of the stream contains an error. Each error detection sub-module 315 may forward the portion of the respective received stream containing an error to the error correction module 215-a (bypassing the error correction module 215 with the error-free portions). The error correction module 215-a includes a number of error correction sub-modules 320, each error correction sub-module 320 responsible for handling the errors from a number of error detection sub-modules 315 (e.g., error correction sub-module 320 may correct errors from error detection sub-modules 315-a, -b, and -c). Error correction sub-modules 320 may correct the received portions of the respective received streams containing an error. Each error correction sub-module 320 may receive portions of streams with errors, and these portion may have been detected in parallel.

Controller 120-a may perform a number of functions in the decoder process. Controller 120-a may dynamically modify the error detection sub-modules 315 and the error correction sub-modules 320 assigned to sectors 305 of flash memory 110-a. The controller 120-a may selectively power-up one or more of the error correction sub-modules 320 responsive to a monitored age or error rate associated with the flash memory 110-a. The controller 120-a may perform this monitoring on a per-sector basis, and the error correction sub-modules 320 may be powered-up to serve the sectors 305 where the error rates exceed a threshold. The controller 120-a may adapt the coding rate to be used by the encoder responsive to a monitored age or error rate associated with the flash memory 110-a. The controller 120-a may perform this monitoring on a per-sector basis, and the controller 120-a may adapt the coding rate on a per sector basis.

Figure 4:
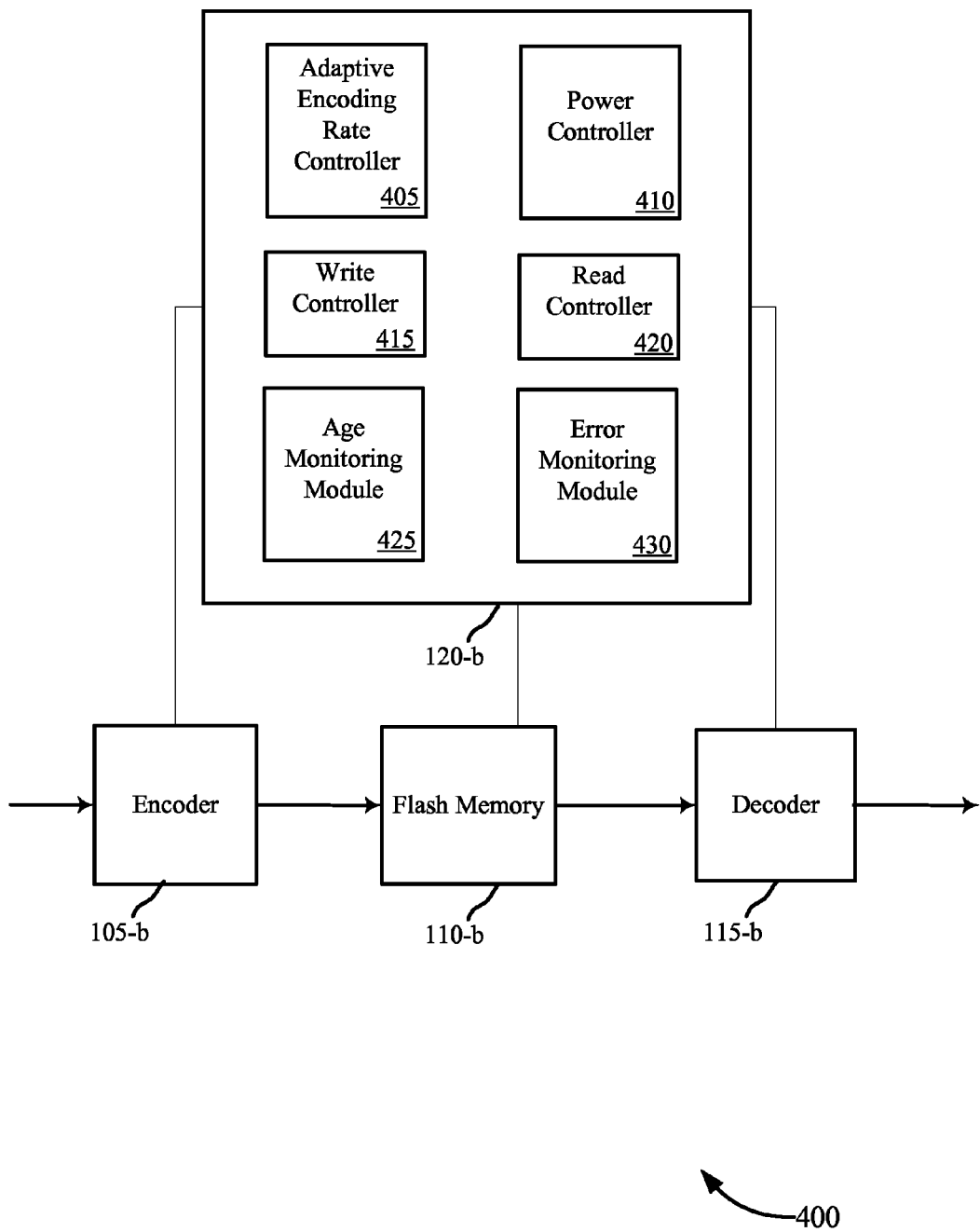
FIG. 4 is a block diagram of a flash memory decoder system illustrating an architecture for a decoder controller according to various embodiments of the invention.

FIG. 4 is a block diagram of a flash memory decoder system 400 illustrating certain controller functionality according to various embodiments of the invention. The system 400 includes an encoder 105-b, flash memory 110-b, a decoder 115-b, and a controller 120-b. This system 400 may be an example of the system 100 of FIG. 1, and a component of this system 400 may have the same functionality as the counterpart component from FIG. 1 This flash memory system 400 may be a stand-alone device, or may be integrated (in whole or in part) with a computer, server, phone, mobile device, tablet, television, or any other computing device.

The controller 120-b includes an adaptive encoding rate controller 405, a power controller 410, a write controller 415, a read controller 420, an age monitoring module 425, and an error monitoring module 430. The age monitoring module 425 may monitor an age associated with the flash memory 110-b. This may be a time since manufacture, a time since first use, an amount of use, or any other metric which corresponds to the aging of the flash memory 110-b. This monitoring may involve direct monitoring of the flash memory 110-b itself, or may be based on reports from the encoder 105-b, decoder 115-b, or other components of the system.

The error monitoring module 430 may monitor an amount of errors associated with the flash memory 110-b. This monitoring may measure errors over a variety of time periods and metrics, and may be translated into an error rate. The monitoring may be performed on a per-sector (or per set of sectors) basis. A number of sampling and averaging techniques may be used. This monitoring may involve direct monitoring of the decoder 115-b itself, or may be based on reports from the decoder 115-b or other components of the system.

The adaptive encoding rate controller 405 may receive information on the rate and/or amount of errors from the error monitoring module 430. The adaptive encoding rate controller 405 may modify a coding rate to be used by the encoder 105-b when the monitored rate and/or amount of errors exceeds a threshold. The monitoring of errors may be performed on a per-sector, per set of sectors, or other regional basis. Thus, the coding rate to be used by the encoder 105-b may be modified when the monitored rate of errors for the applicable region exceeds a threshold. In some embodiments, the coding rate may be adapted to be more, or less, robust; in other embodiments, the adaptation is only to make the coding rate more robust. The adaptive encoding rate controller 405 may receive information on the age of the flash memory 110-b from the age monitoring module 425. The adaptive encoding rate controller 405 may adapt the coding rate based on this monitoring (e.g., implementing a more robust coding rate for one or more sectors of the flash memory 110-b when the age exceeds a threshold). There may be a number of different coding rate change thresholds related both to age and error rate. Moreover, these threshold may be adaptive to the amount of flash memory 110-b that remains available (e.g., the margin may be increased when the flash memory is utilized below a threshold amount).

As noted above, an decoder module 115 may include a number of error correction sub-modules. The power controller 410 may receive information on the age of the flash memory 100-b from the age monitoring module 425. The power controller 410 may selectively power-up (or power-down) one or more of the error correction sub-modules responsive to an age of the flash memory 110-b. The power controller 410 may receive information on the rate and/or amount of errors from the error monitoring module 430. The power controller 410 may power-up (or power-down) one or more of the error correction sub-modules (e.g., when the monitored rate and/or amount of errors exceeds a threshold). The monitoring of errors may be performed on a per-sector, per set of sectors, or other regional basis. Thus, the power-up or power-down may be specific to a particular error correction sub-module for a given region of flash memory 110-b.

The write controller 415 may change the sectors of flash memory 110-b to be written to. These changes may be made in response to information from the age monitoring module 425 and error monitoring module 430. The read controller 420 may dynamically change the components of the decoder 115-b to be used to read different sectors of flash memory 110-b (e.g., in FIG. 3, the assignments of the decoder sub-modules 310, error detection sub-modules 315, and error correction sub-modules 320 may be changed in response to code rate modifications, increased errors, or age).

Figure 5:
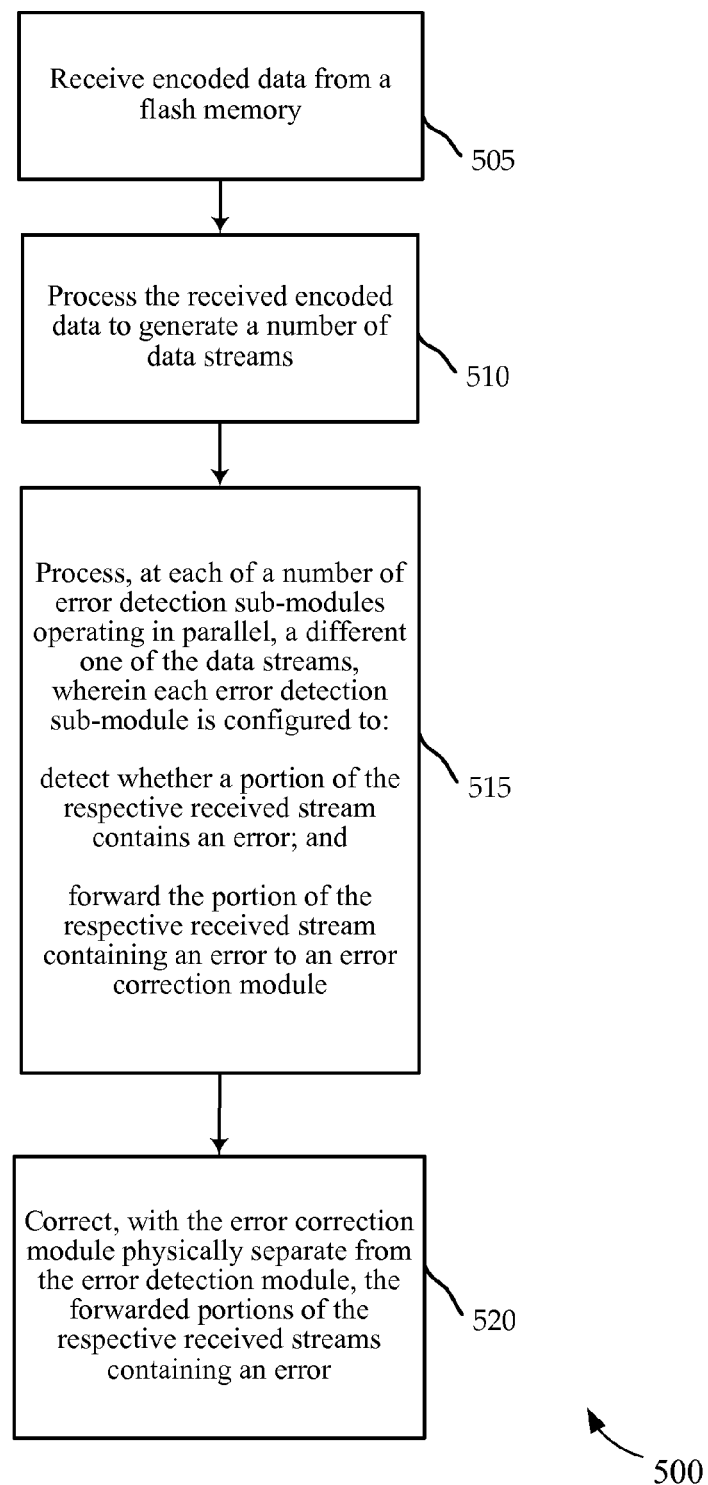
FIG. 5 is a flowchart illustrating a method of decoding data from a flash memory according to various embodiments of the invention.

FIG. 5 is a flowchart illustrating a method 500 of decoding data from a flash memory according to various embodiments of the invention. The method 500 may, for example, be performed in whole or in part by the system 100, 300, or 400 of FIG. 1, 3, or 4 or, more specifically, by the decoder 115 of FIG. 1, 2, or 4.

At block 505, encoded data from a flash memory is received. At block 510, the received encoded data is processed to generate a number of data streams. The information for each data stream may be a wholly or partially decoded before being forwarded to respective error correction sub-modules. At block 515, at each of a number of error detection sub-modules operating in parallel, a different one of the data streams is processed. Each error detection sub-module is configured to: detect whether a portion of the respective received stream contains an error, and forward the portion of the respective received stream containing an error to an error correction module. At block 520, at the error correction module physically separate from the error detection sub-modules, the forwarded portions of the respective received streams containing an error are corrected.

Figure 6:
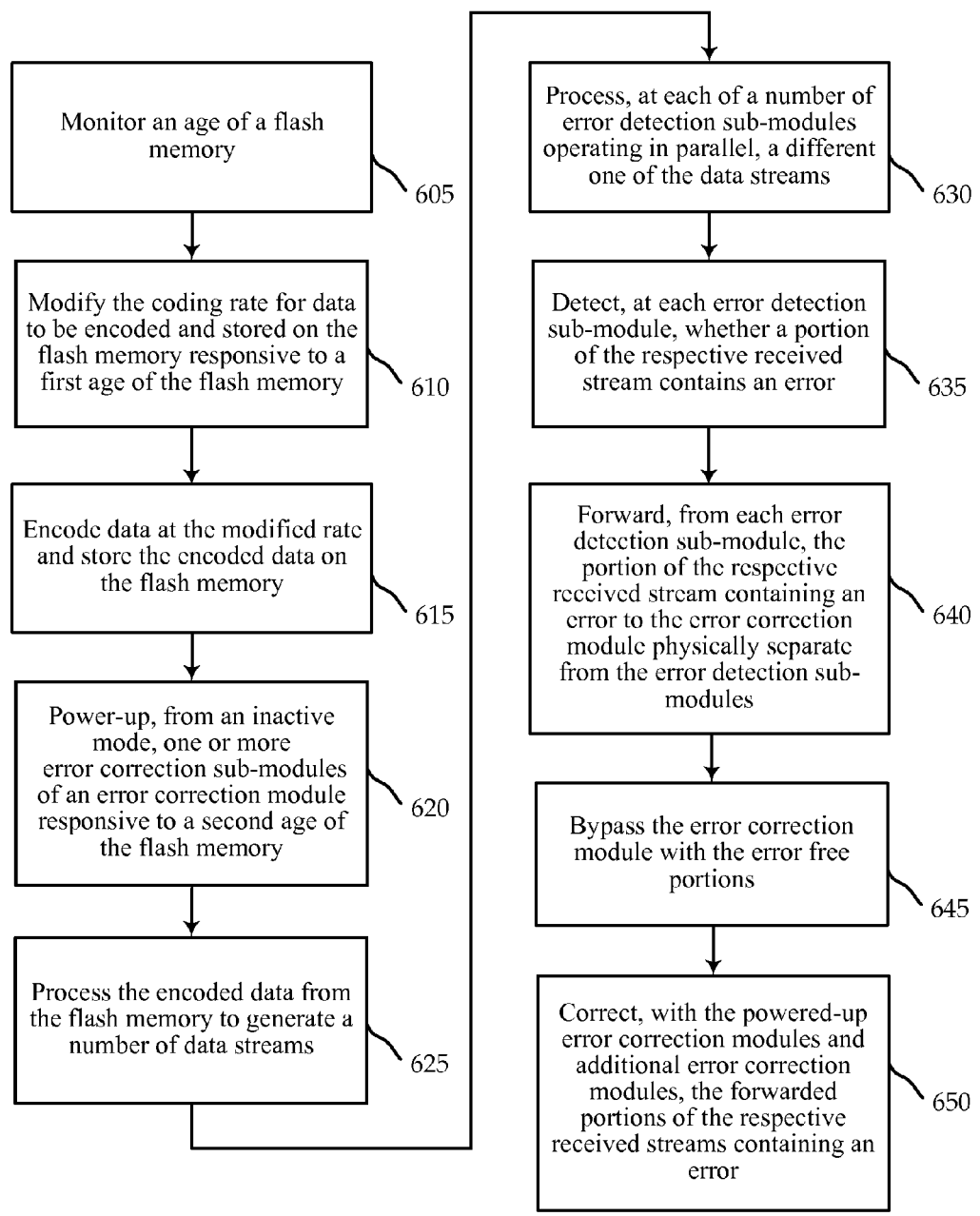
FIG. 6 is a flowchart illustrating a method of age responsive decoding of data from a flash memory according to various embodiments of the invention.

FIG. 6 is a flowchart illustrating a method of age responsive decoding of data from a flash memory according to various embodiments of the invention. The method 600 may, for example, be performed in whole or in part by the system 100, 300, or 400 of FIG. 1, 3, or 4. The method 600 may be an example of the method 500 of FIG. 5.

At block 605, an age of a flash memory is monitored. At block 610, the coding rate for data to be encoded and stored in the flash memory is modified responsive to a first age threshold of the flash memory. At block 615, data is encoded at the modified rate, and the encoded data is stored on the flash memory. At block 620, one or more error correction sub-modules of an error correction module are powered-up from an inactive mode responsive to a second age threshold of the flash memory.

At block 625, the encoded data from the flash memory is processed to generate a number of partially decoded data streams. At block 630, at each of a number of error detection sub-modules operating in parallel, a different one of the data streams is processed. At block 635, a determination is made at each error detection sub-module whether a portion of the respective received stream contains an error. At block 640, error detection sub-modules forward those portions of the respective streams containing an error to the error correction module physically separate from the error detection sub-modules. At block 645, the error-free portions are forwarded to bypass the error correction module. At block 650, the portions of the respective received streams containing an error are corrected with the powered-up error correction modules and additional error correction modules.

Figure 7:
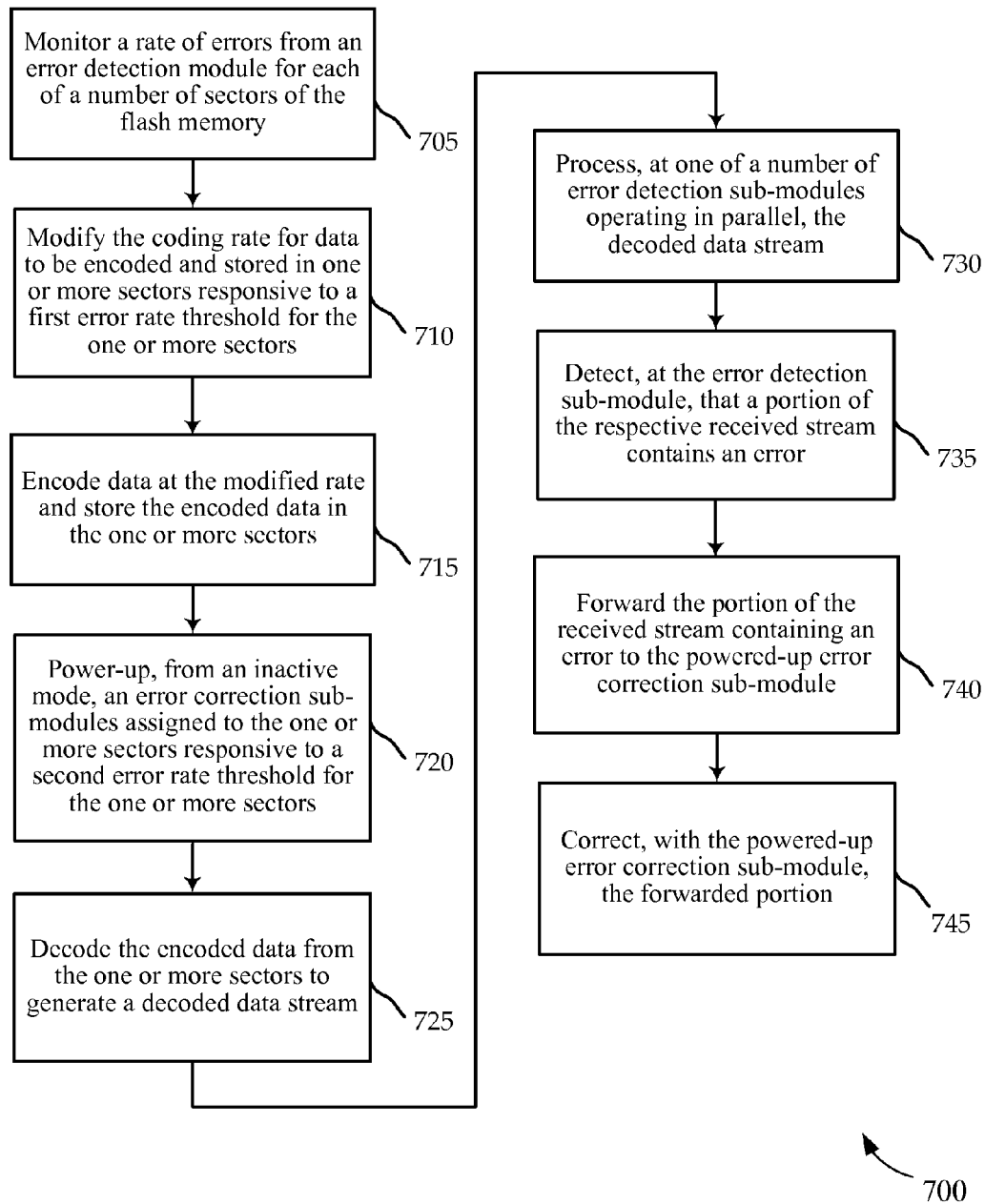
FIG. 7 is a flowchart illustrating a method of decoding data from a flash memory responsive to error rate according to various embodiments of the invention.

FIG. 7 is a flowchart illustrating a method of decoding data from a flash memory responsive to error rate according to various embodiments of the invention. The method 700 may, for example, be performed in whole or in part by the system 100, 300, or 400 of FIG. 1, 3, or 4. The method 700 may be an example of the method 500 of FIG. 5 or the method 600 of FIG. 6.

At block 705, a rate of errors from an error detection module is monitored for each of a number of sectors of the flash memory. At block 710, the coding rate for data to be encoded and stored in one or more sectors is modified responsive to the monitoring of first error rate threshold for the one or more sectors. At block 715, data is encoded at the modified rate and stored in the one or more sectors.

At block 720, an error correction sub-module assigned to the one or more sectors are powered-up from an inactive mode responsive to the monitoring of a second error rate threshold for the one or more sectors. At block 725, the encoded data from the one or more sectors is decoded to generate a decoded data stream. At block 730, at one of a number of error detection sub-modules operating in parallel, the decoded data stream is processed. At block 735, a determination is made by the error detection sub-module that a portion of the respective received stream contains an error. At block 740, the portion of the received stream containing an error is forwarded to the powered-up error correction sub-module. At block 745, the forwarded portion is corrected with the powered-up error correction sub-module.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method comprising:
   encoding data using forward error correction coding;
   storing the encoded data in a flash memory;
   retrieving the encoded data stored in the flash memory to generate a data stream;
   processing, using at least a first error correction sub-module, the data stream to correct errors in the data stream associated with the flash memory;
   monitoring a metric of the flash memory while repeating the encoding, the storing, the retrieving and the processing, wherein the metric represents memory performance degradation of the flash memory;
   determining that the monitored metric exceeds a threshold;
   in response to the determination, modifying the forward error correction coding for use in subsequently encoding data for storage in the flash memory; and
   in response to the determination, powering-up, from an inactive mode, a second error correction sub-module arranged in parallel with the first error correction sub-module for subsequent data stream processing.

2. The method of claim 1, wherein the modifying comprises changing a coding rate of the forward error correction coding.

3. The method of claim 1, wherein the modifying comprises implementing more robust forward error correction coding.

4. The method of claim 1, wherein the metric is based at least in part on an aging of the flash memory.

5. The method of claim 4, wherein the metric is based on one or more of a time since manufacture of the flash memory, a time since first use of the flash memory, and an amount of use of the flash memory.

6. The method of claim 1, wherein the metric is based at least in part on an amount of errors corrected during the processing.

7. The method of claim 6, wherein the metric is based on the amount of errors corrected over a period of time.

8. The method of claim 1, wherein the retrieving, the processing and the monitoring are performed on a sector-by-sector basis of the flash memory.

9. The method of claim 1, further comprising:
subsequently encoding data using the modified forward error correction coding; and
storing the subsequently encoded data in the flash memory.

10. The method of claim 9, wherein the subsequently encoded data is stored in a sector of the flash memory different than that of said encoded data.

11. The method of claim 9, further comprising:
retrieving the subsequently encoded data stored in the flash memory to generate a second data stream; and
processing, using at least the first error correction sub-module and the second error correction sub-module, the data stream to correct errors in the data stream associated with the flash memory.

12. The method of claim 1, wherein the threshold is based at least in part on an amount of available memory within the flash memory.

13. A system comprising:
an encoder to encode data using forward error correction coding;
a flash memory to store the encoded data;
a decoder to retrieve the encoded data stored in the flash memory to generate a data stream, and to process the data stream to correct errors in the data stream associated with the flash memory using at least a first error correction sub-module; and
a controller to:
monitor a metric of the flash memory while repeating the encoding, the storing, the retrieving and the processing, wherein the metric represents memory performance degradation of the flash memory;
determine that the monitored metric exceeds a threshold;
in response to the determination, modify the forward error correction coding for use by the encoder in subsequently encoding data for storage in the flash memory; and
in response to the determination, powering-up, from an inactive mode, a second error correction sub-module arranged in parallel with the first error correction sub-module for subsequent data stream processing.

14. The system of claim 13, wherein the controller changes a coding rate of the forward error correction coding to modify the forward error correction coding.

15. The system of claim 13, wherein the controller implements more robust forward error correction coding to modify the forward error correction coding.

16. The system of claim 13, wherein the metric is based at least in part on an aging of the flash memory.

17. The system of claim 16, wherein the metric is based on one or more of a time since manufacture of the flash memory, a time since first use of the flash memory, and an amount of use of the flash memory.

18. The system of claim 13, wherein the metric is based at least in part on an amount of errors corrected during the processing.

19. The system of claim 18, wherein the metric is based on the amount of errors corrected over a period of time.

20. The system of claim 13, wherein the decoder retrieves the encoded data and processes the data stream on a sector-by-sector basis of the flash memory, and the controller monitors the metric on a sector-by-sector basis of the flash memory.

21. The system of claim 13, wherein:
the encoder subsequently encodes data using the modified forward error correction coding; and
the flash memory stores the subsequently encoded data in the flash memory.

22. The system of claim 21, wherein the flash memory stores the subsequently encoded data in a sector different than that of said encoded data.

23. The system of claim 21, wherein the decoder:
retrieves the subsequently encoded data stored in the flash memory to generate a second data stream; and
processes, using at least the first error correction sub-module and the second error correction sub-module, the data stream to correct errors in the data stream associated with the flash memory.

24. The system of claim 13, wherein the threshold is based at least in part on an amount of available memory within the flash memory.

* * * * *